United States Patent
Kupfer et al.

(10) Patent No.: US 10,144,299 B2
(45) Date of Patent: Dec. 4, 2018

(54) COUPLING DEVICE FOR PRODUCING AND SEPARATING AN ENERGY-TRANSFERRING PLUG-IN CONNECTION AND ENERGY INPUT SYSTEM HAVING SUCH A COUPLING DEVICE

(71) Applicant: AUDI AG, Ingolstadt (DE)

(72) Inventors: Alexander Kupfer, Mannheim (DE); Ilias Gkoumas, Nürnberg (DE)

(73) Assignee: AUDI AG, Ingolstadt (DE)

( * ) Notice: Subject to any disclaimer, the term of this patent is extended or adjusted under 35 U.S.C. 154(b) by 0 days.

(21) Appl. No.: 15/813,545

(22) Filed: Nov. 15, 2017

(65) Prior Publication Data
US 2018/0141448 A1    May 24, 2018

(30) Foreign Application Priority Data

Nov. 21, 2016  (DE) .................. 10 2016 222 853

(51) Int. Cl.
*B60L 11/18*   (2006.01)
*G07F 15/00*   (2006.01)
(Continued)

(52) U.S. Cl.
CPC ....... *B60L 11/1818* (2013.01); *B60L 11/1809* (2013.01); *H01R 13/4532* (2013.01); *H01R 13/4534* (2013.01); *H01R 13/4536* (2013.01); *H01R 13/6205* (2013.01); *H01R 13/71* (2013.01); *G07F 15/005* (2013.01); *H01M 10/44* (2013.01); *H01R 13/6315* (2013.01)

(58) Field of Classification Search
CPC .. H01R 13/518; H01R 13/60; H01R 2201/16; H01R 13/72; H01R 13/4532; H01R 13/4534; H01R 13/6205; H01R 13/71; H01R 13/4536; H01R 13/6315; B23P 19/00; H05K 13/00; Y10S 901/15; B60L 11/1818; B60L 11/1809; G07F 15/005; H01M 10/44
USPC ................ 439/534, 39, 527, 528; 901/15
See application file for complete search history.

(56) References Cited

U.S. PATENT DOCUMENTS 3,777,348 A * 12/1973 Stone .................... B25B 27/023
29/239
3,808,577 A *  4/1974 Mathauser ......... H01R 13/6205
439/180
(Continued)

FOREIGN PATENT DOCUMENTS

| CN | 105071481 A | 11/2015 |
|---|---|---|
| DE | 102011112610 A1 | 3/2013 |
| DE | 102012216980 A1 | 4/2013 |
| DE | 202014100481 U1 | 6/2014 |

OTHER PUBLICATIONS

German Examination Report dated Jun. 19, 2017 from corresponding German Application No. 10 2016 222 853.6 ( 6 pages).

*Primary Examiner* — Gary F Paumen
(74) *Attorney, Agent, or Firm* — Maier & Maier, PLLC

(57) ABSTRACT

A coupling device for producing and separating an energy-transferring plug-in connection, having a plug that can be shifted along a plug-in direction for insertion into a corresponding plug receptacle, and having a drive device, which is operatively connected to the plug for the shifting thereof. In a decoupled state of the coupling device, the plug can be arranged in a position of rest at a tilt with respect to the plug-in direction.

6 Claims, 3 Drawing Sheets

Figure 1:
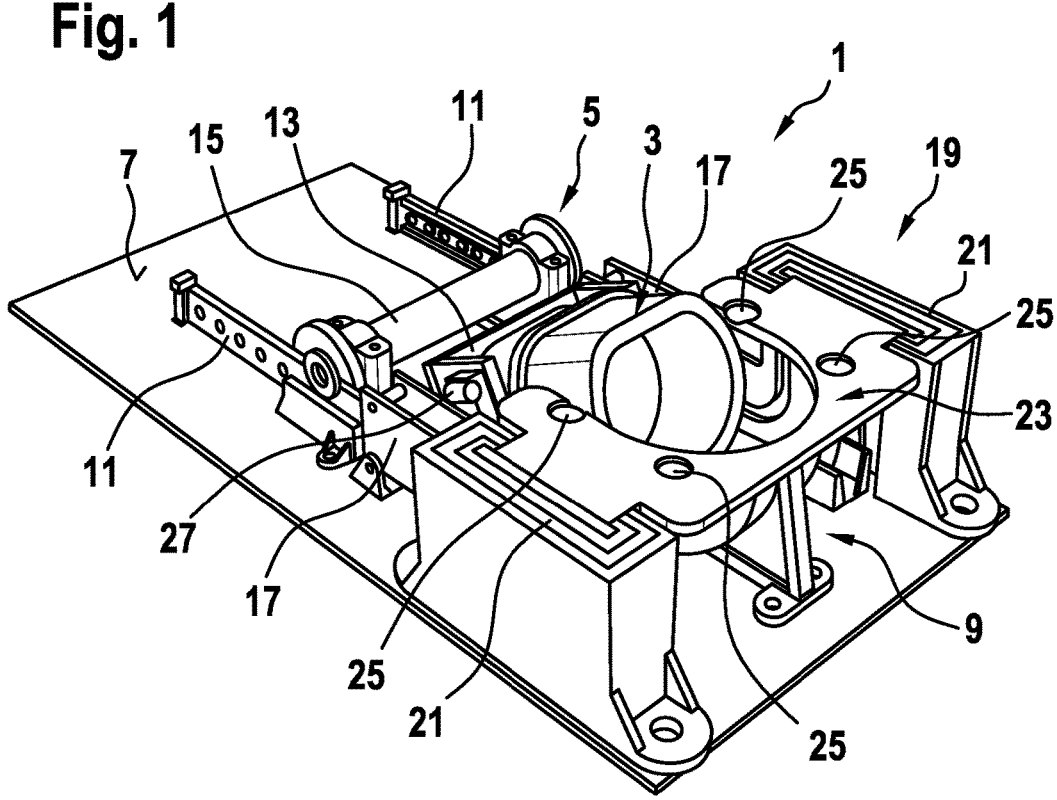

(51) Int. Cl.
*H01M 10/44* (2006.01)
*H01R 13/62* (2006.01)
*H01R 13/71* (2006.01)
*H01R 13/453* (2006.01)
*H01R 13/631* (2006.01)

(56) References Cited

U.S. PATENT DOCUMENTS

| | | | |
|---|---|---|---|
| 3,810,258 A * | 5/1974 | Mathauser | H01R 13/6205 |
| | | | 439/246 |
| 5,461,298 A | 10/1995 | Lara et al. | |
| 7,056,127 B2 * | 6/2006 | Suzuki | H01R 13/6205 |
| | | | 439/22 |
| 7,097,461 B2 * | 8/2006 | Neidlein | H01R 13/24 |
| | | | 439/39 |
| 7,344,380 B2 * | 3/2008 | Neidlein | H01R 13/6205 |
| | | | 439/374 |
| 8,717,747 B2 * | 5/2014 | Chen | H05K 7/1494 |
| | | | 312/223.1 |
| 9,056,555 B1 | 6/2015 | Zhou | |
| 2010/0174434 A1 | 7/2010 | Sip | |
| 2010/0291781 A1 * | 11/2010 | Lee | G06F 1/1632 |
| | | | 439/259 |
| 2013/0260606 A1 * | 10/2013 | Hahakura | H01R 13/60 |
| | | | 439/534 |
| 2013/0338820 A1 | 12/2013 | Corbett | |
| 2015/0049573 A1 * | 2/2015 | Calange | H01R 13/70 |
| | | | 366/129 |
| 2015/0097529 A1 | 4/2015 | Lacour | |

\* cited by examiner

COUPLING DEVICE FOR PRODUCING AND SEPARATING AN ENERGY-TRANSFERRING PLUG-IN CONNECTION AND ENERGY INPUT SYSTEM HAVING SUCH A COUPLING DEVICE

FIELD

The invention relates to a coupling device for producing and separating an energy-transferring plug-in connection and an energy input system for inputting energy into a motor vehicle having such a coupling device.

BACKGROUND

Rod arrangements or lever arrangements are usually used, particularly for the automatic production and separation of plug-in connections, in order to shift a plug linearly in the plug-in direction. Mechanical arrangements that are suitable for this purpose require a large structured space in the plug-in direction. Because the plug, in particular together with its plug head, has to protrude completely from the mechanism in order to be inserted correctly into a corresponding plug receptacle, such as, for example, a plug socket, it is necessary to incorporate the fastening of the mechanism at the plug as well as the application of force by way of the mechanism into the plug below the plug head. Accordingly, the structural height of the mechanism overall—including the plug—is greater than the plug height measured in the plug-in direction. This is a drawback, in particular, when the coupling device is intended to be suitable for producing a plug-in connection in the area of the underbody of a motor vehicle and to be capable of being shifted for this purpose under the motor vehicle. Naturally, such an application results in a very restrictive height limitation for the coupling device and hence, at the same time, also for the shifting mechanism of the plug as well as for the plug itself.

SUMMARY

The object of the invention is to create a coupling device for producing and separating an energy-transferring plug-in connection and an energy input system for inputting energy into a motor vehicle having such a coupling device, wherein the mentioned drawbacks do not occur.

The object is achieved, in particular, in that a coupling device for producing and separating an energy-transferring plug-in connection is created, which has a plug that can be shifted along a plug-in direction for insertion into a corresponding plug receptacle as well as a drive device, which is operatively connected to the plug for the shifting thereof. The drive device is therefore equipped and arranged, in particular, to shift the plug for the purpose of producing and separating a plug-in connection. It is hereby provided that, in a decoupled state of the coupling device, the plug can be arranged in a position of rest at a tilt with respect to the plug-in direction. It has been found in this regard that typical plugs have a height—as measured in the plug-in position and in the plug-in direction—that is greater than a width measured in the plug-in position perpendicular to the plug-in direction. The structural height of the coupling device can therefore be advantageously reduced when, in its position of rest in a decoupled state of the decoupling device, the plug is not aligned along the plug-in direction, but rather is at a tilt with respect to it. A minimum structural height of the entire shifting mechanism, including the plug, can then still be defined more preferably only by the width thereof and no longer by the height thereof. When the plug-in connection is produced or separated, the plug is accordingly not shifted exclusively linearly in the plug-in direction, but additionally tilted or pivoted.

More preferably, it is provided that, in its position of rest, the plug can be arranged tilted or pivoted by 90° with respect to the plug-in direction.

The coupling device is preferably equipped for the automatic production and separation of a plug-in connection, wherein, more preferably, the drive device is provided in order to shift the plug automatically from its position of rest to its plug-in position—and back—and hence to produce or to separate the plug-in connection.

A plug-in direction is understood to mean, in particular, a direction along which, as intended, the plug is inserted into a corresponding plug receptacle, such as, for example, a plug socket. Accordingly, the plug-in direction is defined, in particular, by a final, linear shifting movement of the plug when the plug-in connection is produced as well as, correspondingly, a first linear shifting movement of the plug when the plug-in connection is separated. Besides this actual plug-in operation, it is possible for the plug to perform other, even nonlinear, movements or to be pivoted or tilted.

A plug receptacle is understood to be a device that is correspondingly formed together with the plug in such a way that the plug can be inserted into the plug receptacle for the purpose of energy transfer. Correspondingly, a plug is understood to mean a device that is equipped so as to be inserted into a corresponding plug receptacle in such a way that an energy transfer between the plug and the plug receptacle can occur.

A decoupled state of the coupling device is understood to mean a state in which the plug is not inserted into a plug receptacle. Correspondingly, a coupled state of the coupling device is understood to mean a state in which the plug is inserted into a plug receptacle. Moreover, a plug receptacle can be, in particular, a plug socket.

A position of rest of the plug is correspondingly understood to be a position thereof that it takes when it is not inserted or when it will be inserted into a plug receptacle. Correspondingly, a plug-in position of the plug is understood to mean a position in which the plug can be inserted into a plug receptacle through a linear movement in the plug-in direction or is already inserted into a plug receptacle.

The coupling device is preferably equipped for producing and separating an electrical plug-in connection, wherein the plug is designed as an electrical plug and the plug receptacle is designed as an electrical plug socket. In particular, it is possible that the plug and most especially a plug head thereof is designed in accordance with an authorized plug standard according to IEC 62196 in the version valid on the date determining the priority of the present application.

However, it is also possible that the coupling device is equipped for producing and separating a plug-in connection that can serve for the transfer of other forms of energy, such as, for example, for the transmission of chemical energy, in particular in the form of a fuel, such as, for example, a liquid fuel or a gaseous fuel. The plug-in connection then will create, in particular, a fluidic connection for the transmission of a chemical substance or mixture of substances.

In accordance with an enhancement of the invention, it is provided that the coupling device has a diverting device, which is equipped to divert the plug from its tilted position, that is, in particular from the position of rest, to the plug-in position aligned in the plug-in direction. Preferably, the diverting device is also equipped additionally to divert the plug conversely from its plug-in position to its tilted position of rest. The diverting device makes it possible in a simple and secure way to pivot the plug from its tilted position to its plug-in position and vice versa. In particular, the plug is diverted by the diverting device in the way described when it is driven by the drive device in the direction of a coupled state—or back in the direction of the decoupled state.

In accordance with an enhancement of the invention, it is provided that the drive device has at least one push-pull chain drive. A transmission of force onto the plug is therefore preferably implemented by means of the push-pull chain drive. In this way, it is possible to transmit a force uniformly into the plug over its entire movement and, in particular, also in the plug-in direction. Furthermore, in the case that a counter force opposite to the plug-in direction is too large, the drive mechanism constructed as a push-pull chain drive can yield, without being damaged in the process.

The push-pull chain drive preferably has two push-pull chains. Said chains engage preferably laterally at the plug, each on one side of the plug. As a result of this, the drive force is applied to the plug symmetrically on both sides and space is created in the middle between the two push-pull chains in order to arrange the diverting device.

Alternatively or additionally, it is preferably provided that the push-pull chains engage at a plug foot of the plug. As a result, the push-pull chain drive can be linked to the plug as far as possible from a plug head, so that there are no mechanical obstacles in this respect to the insertion operation itself.

Moreover, a plug foot is understood to be, in particular, a part of the plug that—as viewed in the plug-in position and in the plug-in direction—is arranged below the plug head that is designed and equipped for direct insertion into a plug receptacle, wherein the plug foot, in particular, does not itself engage in the plug receptacle.

Alternatively or additionally, it is preferably provided that the push-pull chains can be driven more preferably via a common shaft. The common axle or shaft can preferably be driven electromechanically, in particular by means an electric motor. Accordingly, it is possible, in particular, to drive both push-pull chains by use of a common motor, wherein the coupling thereof via a common axle or shaft offers, at the same time, the advantage that the push-pull chains constantly execute a symmetrical movement, wherein also an application of force to the push-pull chains and to the plug can occur symmetrically.

The push-pull chains are linked to the plug foot preferably via a connecting axle or a connecting shaft, which extends through a mounting unit at the plug foot. The connecting axle or the connecting shaft that links the push-pull chains to the plug foot, hereby also defines, at the same time, an axis of rotation or pivot axis of the plug for its pivoting or tilting movement from its position of rest to the plug-in position and vice versa.

By means of the push-pull chain, the plug travels preferably against the diverting device when it is shifted from the position of rest to the plug-in position, as a result of which it rotates around the axis of rotation and aligns itself in the plug-in direction. If the push-pull chains then extend further, the plug moves further linearly in the plug-in direction.

The push-pull chain drive preferably has a chain guide, which is equipped to guide the at least one push-pull chain, preferably the two push-pull chains, and, in particular, to divert them from a first orientation in the plug-in direction, obliquely and preferably perpendicularly to the plug-in direction. Preferably, each push-pull chain is associated with a separate chain guide.

In accordance with an enhancement of the invention, it is provided that the diverting device has a diverting ramp, on which the plug runs when it is shifted from the position of rest to the plug-in position and vice versa, wherein the plug can be diverted from its tilted position to the plug-in direction—and, in particular, also vice versa. It is hereby possible for the diverting ramp to be formed as a linear ramp, in particular as an oblique surface. More preferably, however, the diverting ramp has a curved shape, wherein it follows, in particular, the rotational movement of the plug around its axis of rotation from the position of rest to the plug-in position—and vice versa.

In accordance with an enhancement of the invention, it is provided that the diverting ramp is arranged in the middle between the push-pull chains of the push-pull chain drive. As a result, a favorable structural separation between the drive device, on the one hand, and the diverting device, on the other hand, is possible, wherein, moreover, it is also possible to create a space-saving arrangement. Furthermore, the rotational or tilting torque for diverting the plug can be applied by the diverting device at the middle of the plug in an especially advantageous way.

In accordance with an enhancement of the invention, the coupling device has a guide device, which is equipped to guide the plug when it is shifted along the plug-in direction. In this way, the insertion movement of the plug onto a plug receptacle as well as during insertion into the plug receptacle can occur in a defined and guided way. It is hereby preferably provided that the plug is engaged with the guide device only when it has already been diverted in the plug-in direction, wherein it is disengaged from the guide device when it is shifted from the plug-in position to its position of rest.

Preferably, the guide device has a telescopic guide, wherein the guide device can be extended and retracted telescopically, in particular during shifting of the plug along the plug-in direction. In this way, the plug can be guided very simply and, at the same time, securely and stably. The telescopic guide can be constructed relatively easily, because it need only accommodate forces that are directed radially to the plug-in direction, that is, in particular, perpendicularly to the plug-in direction, whereas the forces imposed at the plug in the plug-in direction are supported by the push-pull chains. The telescopic guide preferably has two telescopic elements as guide elements, which can be arranged laterally to the plug and which—as viewed in cross section—are rectangular in shape and hence, in particular, are flat, but can also be alternatively round in shape.

Alternatively or additionally, it is preferably provided that the guide device has a scissor mechanism. It is hereby possible to provide a guide element, designed as a scissor element, laterally to the plug on each of the two sides. Obviously, other suitable embodiments of a guide device are also possible and applicable.

In accordance with an enhancement of the invention, it is provided that the guide device has a plug mounting unit, to which, in its plug-in position, the plug can be detachably connected in a form-fitting and/or force-fitting manner. In particular, the plug is preferably connected detachably to the plug mounting unit when it is shifted from the position of rest to the plug-in position, more preferably only when it is pivoted completely into the plug-in direction and it is preferably detached once again from the plug mounting unit when it is shifted back from the plug-in position to the position of rest.

The plug mounting unit is preferably fastened to the guide elements of the guide device, such as, for example, to a telescopic guide and/or to a scissor mechanism, wherein these guide elements preferably bear the plug mounting unit on both sides.

For form-fitting connection to each other, the plug and the plug mounting unit each have complementary or correspondingly designed form-fitting elements, such as, for example, projections and recesses or elements based on the tongue-and-groove principle. A force-fitting connection of the plug to the plug mounting unit can be effected preferably via magnets.

In accordance with an enhancement of the invention, it is provided that the plug mounting unit has at least one cone magnet, which, in the plug-in position, interacts with a counter magnet of the plug. Alternatively or additionally, it is also possible for the plug to have at least one cone magnet that interacts with a counter magnet at the plug mounting unit. Such a cone magnet preferably has a conical shape and is arranged in a conical bore, wherein it is centered in the conical bore and is forced against a conical wall of the conical bore when it is attracted by the counter magnet. Via the magnetic interaction between the cone magnet and the counter magnet, the counter magnet is also aligned at the same time as the centering of the cone magnet in the conical bore, and, in particular, is centered with respect to the conical bore. The counter magnet can be formed, in particular, as a rod magnet. A detachable connection of the plug to the plug mounting unit via a cone magnet and a corresponding counter magnet combines, in an advantageous way, a form-fitting connection—via the conical shape of the cone magnet and the conical bore—with a force-fitting connection—via the magnetic interaction between the cone magnet and the counter magnet.

Obviously, also a purely mechanical and/or a purely magnetic detachable fastening of the plug at the plug mounting unit is possible.

In accordance with an enhancement of the invention, it is provided that the coupling device is designed as a self-traveling coupling unit. In this way, it is possible for an especially simple and, at the same time, secure as well as automated production and separation of the plug-in connection to occur. More preferably, the coupling device is designed as a charging robot, in particular for the automatic production and separation of a plug-in connection, in particular for electric charging of a motor vehicle.

Preferably, it is provided that the coupling device is designed for free shifting under a motor vehicle. The coupling device is hereby preferably equipped, in particular, to bring about a plug-in connection of the plug to a plug receptacle provided at the underbody of the motor vehicle, wherein, in particular, the plug-in direction—in relation to a support surface or an underbody surface of the motor vehicle—is aligned vertically. In particular, in the case of a coupling device embodied in this way, the already described advantages are realized in a special way, in particular because only a small structural height is available under a motor vehicle.

The coupling device preferably has a maximum height, measured over an underbody surface on which the coupling device stands, in particular in the position of rest of the plug, of at most 25 cm, preferably at most 22 cm, preferably at most 20 cm, preferably at most 15 cm, preferably at most 11 cm. More preferably, the maximum height is at least 2 cm, preferably at least 3 cm, preferably at least 4 cm, preferably at least 5 cm, preferably at least 6 cm, preferably at least 7 cm, preferably at least 8 cm, preferably at least 9 cm, preferably at least 10 cm. More preferably, the maximum height is 8 cm. With the height given here, the coupling device is suitable for being able to be shifted freely under conventional motor vehicles, in particular passenger motor vehicles.

Finally, the object is also achieved in that an energy input system for inputting energy into a motor vehicle is created, which has a coupling device in accordance with one of the aforementioned exemplary embodiments. Moreover, the energy input system has a motor vehicle, wherein the motor vehicle has a plug receptacle at an underside, in particular at an underbody, in which the plug of the coupling device can be inserted along a—preferably vertically oriented—plug-in direction. The advantages that were already explained in connection with the coupling device are hereby realized in association with the energy input system.

It is possible that the plug-in direction is not oriented exactly vertically, but rather can also be directed obliquely upwards. An exactly vertically oriented plug-in direction is also possible, however.

The motor vehicle is preferably designed as a passenger motor vehicle.

The energy input system is preferably designed for inputting electrical energy into the motor vehicle, wherein the plug is designed, in particular, as an electrical plug and the plug receptacle is designed, in particular, as an electrical plug socket.

By means of the energy input system, it is possible, in particular, in a very simple and automatable way, in particular in an automated way, to input energy into a motor vehicle, in particular to charge an electrical energy storage unit of a motor vehicle that can be driven at least also electrically.

BRIEF DESCRIPTION

Figure 2:
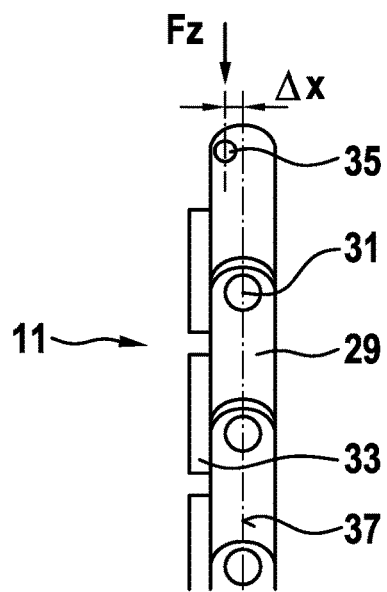
Figure 3:
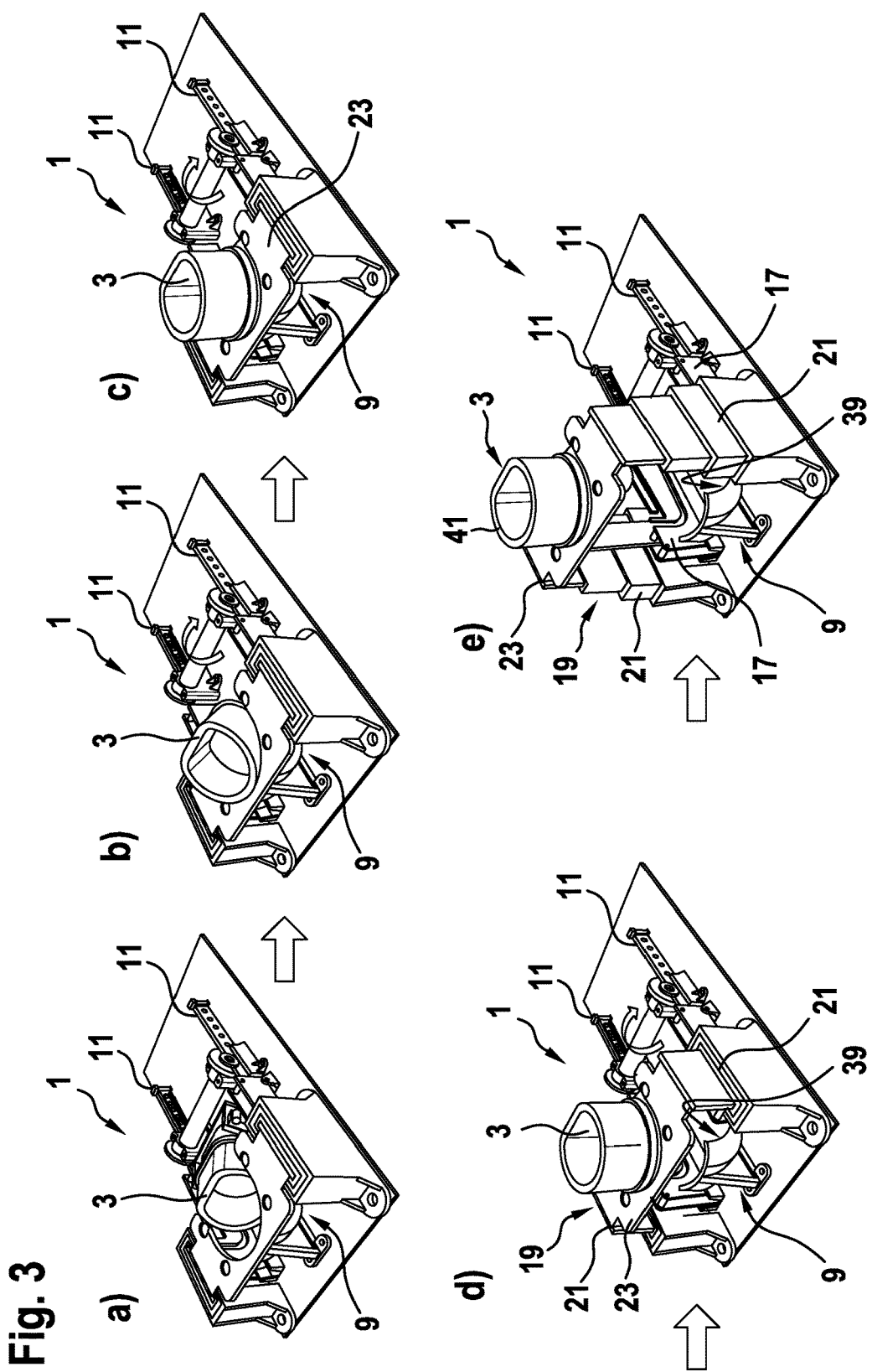
Figure 4:
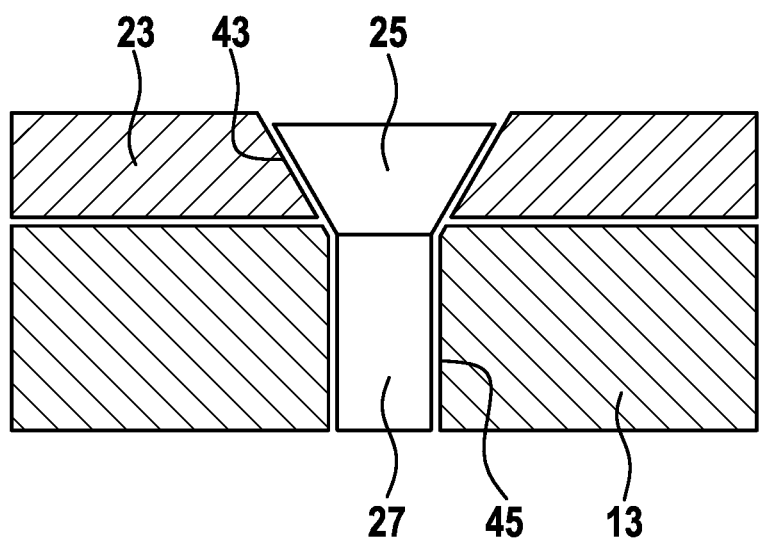

The invention is explained below on the basis of the drawing. Shown therein are:

FIG. 1 an illustration of an exemplary embodiment of a coupling device;

FIG. 2 a schematic detailed illustration of the exemplary embodiment of the coupling device in accordance with FIG. 1;

FIG. 3 an illustration of the operating principle of the exemplary embodiment of the coupling device in accordance with FIG. 1; and FIG. 4 another schematic detailed illustration of the exemplary embodiment of the coupling device in accordance with FIGS. 1 to 3.

DETAILED DESCRIPTION

FIG. 1 shows a schematic illustration of an exemplary embodiment of a coupling device 1, which is equipped for producing and separating an energy-transferring—preferably electrical—plug-in connection, which has shiftable plug 3, which can be inserted along a plug-in direction into a corresponding plug receptacle, which is not illustrated, as well as a drive device 5, wherein the drive device 5 is operatively connected to the plug 3 for shifting thereof. In a decoupled state of the coupling device 1, which is illustrated in FIG. 1, in which said plug is not inserted in the plug receptacle, the plug 3 can thereby be arranged, in the position of rest, at a tilt with respect to the plug-in direction. The plug-in direction extends here, in particular perpendicularly to a bottom plane 7 of the coupling device 1. Owing to the tilted arrangement of the plug 3 with respect to the plug-in direction in the position of rest, the coupling device 1 can be designed to be especially small in the decoupled state and, in particular, can be designed with a small height—as measured in the plug-in direction—because the plug 3 typically has a width that is smaller than its height measured in the plug-in position in the plug-in direction. Accordingly, particularly the minimum height of the coupling device 1 is no longer determined by the height of the plug 3, but rather by the width thereof.

Moreover, the coupling device 1 has a diverting device 9, which is described in detail below and is equipped to divert the plug 3 from its tilted position—that is, in particular, its position of rest—to its plug-in position, aligned in the plug-in direction, when the plug is driven by the drive device 5 in the direction of a coupled state of the coupling device 1. Conversely, the diverting device 9 is also equipped to divert the plug from the plug-in position to its tilted position of rest when it is driven by the drive device 5 in the direction of the decoupled state of the coupling device 1.

The drive device 5 has at least one push-pull chain drive that has here, in particular, two push-pull chains 11, which are arranged laterally on each side of the plug 3 and engage at a plug foot 13 of the plug 3. In particular, they are linked via a connecting axle or connecting shaft to the plug foot 13, which, at the same time, defines the pivot axis for the tilting movement of the plug 3 from its position of rest to its plug-in position—and vice versa.

The push-pull chains 11 can be driven via a common drive shaft 15, wherein the drive shaft 15 is preferably operatively connected to a preferably electromechanical drive, which is not illustrated, in particular to an electric motor. Via the common drive shaft 15, the push-pull chains 11 can be driven synchronously and with symmetrical force distribution.

Here, the diverting device 9 is arranged in the middle between the push-pull chains 11; this is favorable, on the one hand, for reasons of structural space and, on the other hand, for a symmetrical application of a tilting torque to the plug 3.

Moreover, for each of the push-pull chains 11, the coupling device 1 has a respective chain guide 17, which, in particular, is equipped for diverting the push-pull chains 11 from their horizontal position with respect to the bottom plane 7 to the vertical orientation of the plug 3, aligned in the plug-in direction, when the plug 3 is shifted from the position of rest to the plug-in position.

Moreover, the coupling device 1 has a guide device 19, which is equipped to guide the plug 3 when it is shifted in the plug-in direction. Here, the guide device 19 is constructed as a telescopic guide and has a respective telescopic element 21 laterally on each side of the plug, wherein, in this case, the telescopic elements 21 each have a rectangular cross section and a flat construction. It is also possible, alternatively or additionally, that the guide device 19 has round telescopic elements, and/or that the guide device 19—additionally or alternatively to the telescopic elements 21—has a scissor mechanism with corresponding scissor elements. The guide device 19 need not be constructed to be especially stable, because it must only accommodate forces perpendicular to the plug-in direction, wherein forces that act in the plug-in direction are absorbed by the push-pull chains 11.

Moreover, the guide device 19 has a plug mounting unit 23, to which the plug 3, in its plug-in position, can be connected detachably in a form-fitting and/or force-fitting manner—here, in particular in a form-fitting and force-fitting manner. For this purpose, the plug mounting unit 23, in the exemplary embodiment illustrated here, has at least one cone magnet and, in this case, exactly four cone magnets 25, which interact with corresponding counter magnets, one counter magnet 27 of which is illustrated here, in the plug-in position of the plug 3, in order to connect them detachably to the plug mounting unit 23 in a form-fitting and force-fitting manner. The connection of the plug 3 to the plug mounting unit 23 hereby occurs only during or after its pivoting into the plug-in position and the plug 3 is separated from the plug mounting unit 23 when it is pivoted from the plug-in position back to the position of rest. The function of the cone magnets 25 will be explained in detail in connection with FIG. 4.

The main function of the guide device 19 is, moreover, to be regarded as defining the position of the plug 3 when it is shifted in the plug-in direction, whereby it does not need to absorb any insertion force, which instead is transmitted via the axis of rotation of the plug directly to the push-pull chains 11. Therefore, the guide device 19 need only be able to accommodate small loads.

FIG. 2 shows a schematic detailed illustration of the exemplary embodiment of the coupling device 1 in accordance with FIG. 1. Identical and functionally identical elements are provided with identical reference characters, so that reference is made to the preceding description in this regard. In this case, one of the two push-pull chains 11 is illustrated, in particular, and everything that has been stated in regard to the push-pull chain 11 illustrated in FIG. 2 also applies to the other one of the two push-pull chains 11, because said push-pull chains preferably have an identical construction. The push-pull chains 11 have chain links 29, which are linked to one another via joint axes 31. Moreover, each chain link 29 has a chain stop 33, wherein the chain stops 33 are all arranged on a same side of the push-pull chain 11 and, in a way that is known in and of itself, cause the push-pull chain 11 to be able to be diverted in a first direction—in FIG. 2, in the clockwise direction to the right, and wherein the chain cannot be diverted in an opposing direction—in FIG. 2, counterclockwise to the left, because this is prevented by the chain stops 33. In particular, the chain cannot buckle in these two directions, which are blocked by the chain stops 33.

In this case, in order to be able to safely absorb, in particular, the insertion forces that act in the plug-in direction on the plug 3, the connecting shaft 35, with which the push-pull chains 11 engage at the plug 3, is shifted by a specific distance $\Delta x$ from a central plane 37 of the push-pull chain 11 outwards in the direction of the chain stops 33. A force Fz applied along the plug-in direction to the push-pull chain 11 therefore results in a buckling torque, the tendency of which is to attempt to buckle the push-pull chain 11 around the uppermost joint axis 31 in the direction of the chain stops 33, this being prevented, however, by the chain stops 33. Accordingly, owing to the off-center arrangement of the connecting shaft 35 at the push-pull chain 11 in the direction of the chain stops 33, a buckling of the push-pull chain 11 is overall prevented, so that said push-pull chain can absorb the forces acting in the plug-in direction in a secure and stable manner.

Preferably, it is additionally provided that the chain guides 17 are designed—as viewed in the plug-in direction—long enough that they always carry at least two of the chain links 29.

FIG. 3 shows a schematic illustration of the operating principle of the exemplary embodiment of the coupling device 1 in accordance with FIG. 1. Identical and functionally identical elements are provided with the same reference characters, so that reference is made in this regard to the preceding description. The sequence of the individual FIGS.

3a) to 3e) hereby shows, in separate steps, the shifting of the plug 3 from its position of rest, illustrated in FIG. 3a), to the plug-in position, illustrated in FIG. 3e) and, in particular, in the coupled state of the coupling device 1 shown there, wherein, however, the plug receptacle, in which the plug 3 is inserted in the coupled state, is not illustrated.

It is hereby shown that the push-pull chains 11 initially cause the plug 3 to travel against the diverting device 9, on which it runs and by way of which it is pivoted from its position of rest to the plug-in position. Once this pivoting movement—as illustrated in FIG. 3c)—has been completed, the plug 3 is connected detachably to the plug mounting unit 23 and, when the push-pull chains 11 are further shifted in the plug-in direction, the plug mounting unit 23 is shifted—as illustrated in FIG. 3d)—together with the plug 3 in the plug-in direction—in this case, upwards, wherein the telescopic elements 21 of the guide device 19 are extended telescopically. In the process, the guide device 19 prevents any movement in a plane perpendicular to the plug-in direction of the plug 3.

The insertion process of the plug 3 into the plug receptacle, which is not illustrated here, is preferably concluded in the position illustrated in FIG. 3e), but it is preferably also possible to shift the plug 3 still further in the plug-in direction.

On the basis of FIG. 3d) and e), it is also shown that the diverting device 9 preferably has a diverting ramp 39, on which the plug 3 runs when it is shifted from the position of rest to the plug-in position, whereby it is diverted from the tilted position to the plug-in direction. The plug 3 is therefore caused by the push-pull chains 11 to travel against the diverting ramp 39, whereby it then rotates around an axis of rotation defined by the connecting shaft 35 and rises up. If the push-pull chains 11 are then extended further, the plug 3—guided by the guide device 19—moves further along the plug-in direction linearly. In this case, the diverting ramp 39 is arranged in the middle between the push-pull chains 11.

On the basis of FIG. 3e), it is further shown that the plug mounting unit 23 is preferably designed in such a way and is connected to the plug 3 in such a way that a plug head 41—which is inserted into the corresponding plug receptacle, which is not illustrated here—always protrudes a certain distance over the plug mounting unit 23; this is ultimately indispensible for being able to insert the plug 3 completely into the plug receptacle.

FIG. 4 shows another detailed illustration of the exemplary embodiment of the coupling device 1 in accordance with FIGS. 1 to 3. Identical and functionally identical elements are provided with the same reference characters, so that reference is made in this regard to the preceding description. Here, the plug receptacle 23 is illustrated in a schematic sectional illustration together with a cone magnet 25 and the plug foot 13 is illustrated in a schematic sectional illustration together with a counter magnet 27, whereby it becomes clear that the cone magnet 25 is arranged in a conical bore 43. In contrast to this, the counter magnet 27 is preferably formed as a rod magnet and is arranged in a bore, in particular, in a cylindrical bore 45 of the plug foot 13. Owing to the magnetic attraction of the cone magnet 25 and the counter magnet 27, the cone magnet 25 is shifted into the conical bore 43—downwards in FIG. 4—when the plug 3 is connected to the plug mounting unit 23, so that said plug is forced against the conical wall of the conical bore 43 and hence centered. Due to the magnetic coupling, it results that the counter magnet 27 and thus the plug foot 13 are therefore centered as well. By use of the cone magnet 25 and the counter magnet 27, it is therefore possible, at the same time, to achieve a force-fitting and form-fitting connection of the plug 3 to the plug mounting unit 23.

The coupling device 1 is preferably designed as a self-traveling coupling unit, in particular as a charging robot, and is preferably designed for free shifting under a motor vehicle.

Preferably, the coupling device 1 is part of an energy input system, which comprises the coupling device 1 and a motor vehicle, for inputting energy into a motor vehicle, wherein the motor vehicle has a plug receptacle at an underside, in particular at an underbody, into which the plug 3 of the coupling device 1 can be inserted along the plug-in direction. The plug-in direction is thereby preferably vertically oriented.

Overall, it is shown that the coupling device 1 and the energy input system presented here make it possible to provide a flatly constructed, compact lifting mechanism for creating a plug-in connection, which can be shifted in a straightforward manner under a motor vehicle designed as a passenger motor vehicle.

The invention claimed is:

1. A coupling device for producing and separating an energy-transferring plug-in connection, comprising:
   a plug, which can be shifted along a plug-in direction for insertion into a corresponding plug receptacle, and
   a drive device, which can be operatively connected to the plug for the shifting thereof, in a decoupled state of the coupling device, the plug can be arranged in a position of rest at a tilt with respect to the plug-in direction;
   wherein the drive device has at least one push-pull chain drive, which preferably has two push-pull chains, wherein the push-pull chains:
   a) engage laterally on each side of the plug,
   b) engage at a plug foot of the plug, and
   c) can be driven via a common axle;
   wherein the diverting device has a diverting ramp, on which the plug runs when it is shifted from the position of rest to the plug-in position, wherein the plug can be diverted from its position of rest to the plug-in direction; and
   wherein the diverting ramp is arranged in a middle area between the push-pull chains of the push-pull chain drive.

2. The coupling device according to claim 1, further comprising:
   a diverting device, which is equipped to divert the plug from its position of rest to a plug-in position, which is aligned in the plug-in direction.

3. The coupling device according to claim 1, further comprising:
   a guide device, which is equipped to guide the plug when it is shifted in the plug-in direction, wherein the guide device has
   a) a telescopic guide.

4. The coupling device according to claim 3, wherein the guide device has a plug mounting unit, with which, in its plug-in position, the plug can be connected detachably in a form-fitting and force-fitting manner.

5. The coupling device according to claim 4, wherein the plug mounting unit has at least one cone magnet, which, in the plug-in position, interacts with a counter magnet arranged at the plug.

6. The coupling device according to claim 1, wherein the coupling device is designed as a self-traveling coupling unit, as a charging robot, and is designed for free shifting under a motor vehicle.

* * * * *